(12) United States Patent
Carlson

(10) Patent No.: US 8,563,864 B2
(45) Date of Patent: Oct. 22, 2013

(54) FLEXIBLE TUBING AND NOVEL MANUFACTURING METHODS FOR MAKING SUCH A TUBING

(76) Inventor: Eric Carlson, Laguna Hills, CA (US)

( * ) Notice: Subject to any disclaimer, the term of this patent is extended or adjusted under 35 U.S.C. 154(b) by 359 days.

(21) Appl. No.: 13/066,972

(22) Filed: Apr. 30, 2011

(65) Prior Publication Data

US 2011/0209889 A1 Sep. 1, 2011

Related U.S. Application Data

(63) Continuation-in-part of application No. 11/903,898, filed on Sep. 25, 2007, now Pat. No. 7,965,930.

(51) Int. Cl.
  H01B 7/18 (2006.01)
  H01B 11/06 (2006.01)
  B29C 63/10 (2006.01)
  B29C 53/58 (2006.01)
  F16L 53/00 (2006.01)

(52) U.S. Cl.
  USPC ............. 174/108; 174/34; 156/187; 156/191; 392/465; 392/478; 138/33; 137/341; 219/547

(58) Field of Classification Search
  USPC ............... 174/3, 108; 156/187, 191; 392/465, 392/478; 138/33; 137/341; 219/547
  See application file for complete search history.

(56) References Cited

U.S. PATENT DOCUMENTS

| | | | | |
|---|---|---|---|---|
| 3,717,746 A * | 2/1973 | Breitweiser | ............... | 219/200 |
| 3,963,856 A * | 6/1976 | Carlson et al. | ............... | 174/47 |
| 4,038,519 A * | 7/1977 | Foucras | ............... | 392/472 |
| 4,336,415 A * | 6/1982 | Walling | ............... | 174/47 |
| 4,693,324 A * | 9/1987 | Choiniere et al. | ............... | 174/47 |
| 4,826,423 A * | 5/1989 | Kemp et al. | ............... | 425/505 |
| 5,352,871 A * | 10/1994 | Ross et al. | ............... | 219/633 |
| 5,637,168 A * | 6/1997 | Carlson | ............... | 156/143 |
| 5,848,223 A * | 12/1998 | Carlson | ............... | 392/478 |
| 6,190,480 B1 * | 2/2001 | Carlson | ............... | 156/143 |
| 6,248,954 B1 * | 6/2001 | Clark et al. | ............... | 174/113 R |
| 6,367,510 B1 * | 4/2002 | Carlson | ............... | 138/121 |
| 6,537,405 B1 * | 3/2003 | Henderson et al. | ............... | 156/195 |
| 6,932,119 B2 * | 8/2005 | Carlson | ............... | 138/121 |
| 2003/0183294 A1 * | 10/2003 | Carlson | ............... | 138/129 |
| 2005/0034891 A1 * | 2/2005 | Ekeberg et al. | ............... | 174/113 R |
| 2009/0078440 A1 * | 3/2009 | Carlson et al. | ............... | 174/47 |

\* cited by examiner

Primary Examiner — Timothy Thompson
Assistant Examiner — Rhadames J Alonzo Miller
(74) Attorney, Agent, or Firm — Terry L. Miller

(57) ABSTRACT

A smooth-bore plastic tubing with an outer helical support bead is resistant to collapse and incorporates plural conductors disposed outside of the tubing bore and insulated both from ambient and from one another. The conductors may have a desired relatively high thermal conductivity to tidal air flow within the tubing, while also having a comparatively high thermal resistance to ambient. The conductors may be electrical conductors, or may include fiber optic conductors as well in the same tubing structure. A method for making the tubing includes extruding a molten thermoplastic ribbon. The plastic ribbon is wrapped to form a tubular body, and a grooved plateau portion is wrapped upon the tubular body. At least one conductor is embedded in the groove of the plateau portion. Finally a molten thermoplastic bead is then applied atop the plateau portion and atop of the embedded conductor providing a unitary flexible tubing structure with substantially smooth inside and outside surfaces free of crevices which could retain soil or bacteria.

17 Claims, 3 Drawing Sheets

FLEXIBLE TUBING AND NOVEL MANUFACTURING METHODS FOR MAKING SUCH A TUBING

CROSS REFERENCE TO RELATED APPLICATION

This application is a Continuation-In-Part of and allowed U.S. patent application Ser. No. 11/903,898, now U.S. Pat. No. 7,965,930, granted June 21, 2011, the disclosure of which is incorporated herein by reference to the extent necessary for a complete enabling disclosure of the present invention.

BACKGROUND OF THE INVENTION

1. Field of the Invention

The present invention relates generally to collapse-resistant, flexible thermoplastic tubing, to such plastic tubing which includes plural helical conductors extending along the length of the tubing, to such a tubing structure manufactured by use of novel and unique manufacturing methods, and to a method for making such flexible plastic tubing.

2. Description of Conventional Technology

Tubing having a relatively thin wall and an integral helical supporting bead is known in the art. Such support-bead tubing construction provides substantial crush resistance while leaving the tube wall flexible enough to permit short-radius bends without collapsing or kinking the tube. The versatility of this kind of tubing is evidenced by its wide applicability in construction, ventilation, manufacturing processes, auto washes, hospitals, medical devices, and other fields. In medical applications the necessity to maintain a clean environment dictates that the tubing be free of crevices both inside and outside because soil or bacterial contamination could reside in such crevices were they present. A smooth inner bore for the tubing is also important because flow resistance must be kept to a minimum when a tidal air flow is conducted through the tubing, as is the case with inhalation therapy, PAP, CPAP (Continuous Positive Airway Pressure) and other breathing-assistance machines.

U.S. Pat. No. 3,910,808 to Steward, assigned to the same assignee as this application, discloses apparatus for forming such thin-walled, flexible, crush resistant support-bead tubing. Steward discloses means for extruding a plastic strip having a longitudinal rib, and winding means for helically winding the strip about an axis to produce a corrugated flexible tubing having a smooth bore.

Further, U.S. Pat. No. 5,454,061, also to Steward, discloses apparatus for forming such thin-walled, flexible, crush resistant support-bead tubing also including a helically disposed conductor. Steward '061 discloses a tubing in which the conductor is disposed adjacent to overlapping side edges of an extruded plastic strip or ribbon, which is wrapped helically on itself while molten to form the tubing wall. The overlapped edges of the ribbon as well as the conductor are then helically covered with an extruded molten bead, which also bonds with and becomes an integral part of the tubing.

With the Steward '061 tubing, and with other conventional tubing, when plural conductors are disposed in the tubing wall, they are immediately adjacent to one another. In some applications when the conductors are used for warming, heating, or maintaining the temperature of a fluid flow in the tubing by means of resistance heating, for example, the heating from these conductors is concentrated at their location. It may be desirable for the conductors to not be immediately adjacent to one another so that heating is somewhat more dispersed. Further, when plural conductors are disposed in such a tubing wall, and one or more of the conductors is utilized for conducting instrumentation or telemetry signals, then it may also be desirable for the conductors to be spaced apart a controlled and determined distance for purposes of preserving signal clarity and fidelity, for insuring electrical insulation between the conductors, and for preventing or reducing mutual inductive and/or capacitive coupling among the conductors, including the heating conductors and the signal conductors. Particularly, it may be an advantage to provide a form of instrumentation conductor which better preserves signal quality.

No prior product, method of manufacture, or apparatus is known which provides a thin-walled, smooth-bore tube having plural spaced apart conductors helically imbedded in the outer structure of the tube and which conductors are available for heating of tidal air flow in the tube, as well as for instrumentation or telemetry signals to be conducted along the length of the tube, with an instrumentation conductor arrangement that well preserves the quality of signals transmitted along the tube, all with a smooth bore and a helically ribbed but substantially crevice-free outer surface.

Those ordinarily skilled in the pertinent arts and familiar with U.S. Pat. No. 3,910,808 to Steward will understand that tubing of the type described in this application is generally manufactured using an apparatus including a winding or wrapping head having plural (usually 4) cantilevered and rotationally driven winding rolls. These winding rolls are canted both axially and radially, and are spaced about a longitudinal axis for winding and rotationally advancing a helically wound and ribbed flexible tubing. The winding rolls rotate in unison while a molten plastic ribbon is helically wrapped on itself and integrally heat bonds to form a spinning and axially advancing tubing wall. The tubing is cooled internally and externally by air, water, or a combination thereof, delivered and directed onto the forming tubing so as to allow the molten plastic ribbon and other parts to fuse, and to accomplish solidification and cooling of the plastic. While the tubing is being formed, conductors are placed onto or within the tubing wall, and an outer molten bead is wrapped helically along the tubing wall atop of the conductors. The bead integrally heat bonds to become a part of the tubing wall. The tubing is cooled finally in an immersion water bath, and is then cut into determined lengths.

SUMMARY OF THE INVENTION

In view of the deficiencies of the related art as discussed above, it is a primary object of the present invention to provide a flexible, lightweight, crush-resistant tubing having an arrangement of conductors which is particularly advantageous for resistance warming of fluid flow within the tubing, and possibly for conveying instrumentation signals as well, and a supporting bead helically wound about and integral with the wall of the tubing.

It is another object of this invention to provide such a tubing in which the wall of the tubing provides an elevated helical plateau, in which one or more helical grooves or crevices are defined, and into which the one or more conductors are disposed and spaced uniformly and helically about and along the length of the tubing, to there be integrally covered by a support bead.

Still another object for this invention is to provide a tubing as described immediately above, and in which the conductors include at least one instrumentation conductor arrangement (preferably in the form of a twisted pair set of conductors) which well preserves the quality of instrumentation signals transmitted along this instrumentation conductor arrangement. An upper or cap portion of the support bead retains and protects the conductor(s) of the tubing.

These and other objects are achieved by the present invention which provides: a thin-walled, flexible and collapse-resistant thermo-plastic tubing having a substantially smooth bore and a helical outer support bead structure, the tubing including at least one conductor helically disposed within the support bead structure, the tubing comprising; a flexible tubing wall formed of an elongate thermoplastic ribbon while molten being helically wrapped repeatedly on itself to partially overlap successive wraps of the ribbon a certain amount forming a helical lap joint where successive wraps of the ribbon heat-bond integrally to one another so that an elongate tubular body is formed; a second elongate thermoplastic ribbon while molten being helically wrapped about the tubular body at the lap joint and heat-bonding integrally thereto to form a plateau portion, the second elongate thermoplastic ribbon defining at least one elongate fine-dimension groove; at least one elongate conductor disposed in the elongate fine-dimension groove of the second elongate thermoplastic ribbon to be embedded within the plateau portion and helically around and along the elongate tubular body; an elongate thermoplastic support bead portion disposed helically around and along the elongate tubular body atop of the plateau portion and at least one conductor embedded therein, the support bead portion integrally heat-bonding to the second ribbon and tubular body so that the plateau portion and the support bead portion cooperatively form the bead structure, and the tubing comprises a unitary thin-walled tubing structure with helical outer support bead and embedded conductor extending helically about and along the tubing.

For resistance heating purposes, the wire conductor is preferably formed of copper, although resistive metal such as nickel-chromium may also be utilized. For telemetry purposes, the conductor(s) may be any suitable conductive material, including metals and conductive polymers, for example. A conductor which conveys light may also be employed (i.e., a fiber-optic conductor). Further, one or more of the conductors may comprise a twisted-pair of electrical conductors, which provides unique properties in terms of inductive and capacitive coupling among the conductors as well as with respect to ambient sources of electro-magnetic interference.

Further applications of the present invention will be apparent to those skilled in the art from a consideration of fully detailed exemplary embodiments thereof. To aid in the explanation of the exemplary embodiments, reference will be made to the figures of the appended sheets of drawings, which figures will first be described briefly.

BRIEF DESCRIPTION OF THE DRAWING FIGURES

The advantages and features of the present invention will be better understood by the following description when considered in conjunction with the accompanying drawings in which:

FIG. 1 provides an exterior view of a tubing according to this invention;

Figure 1:
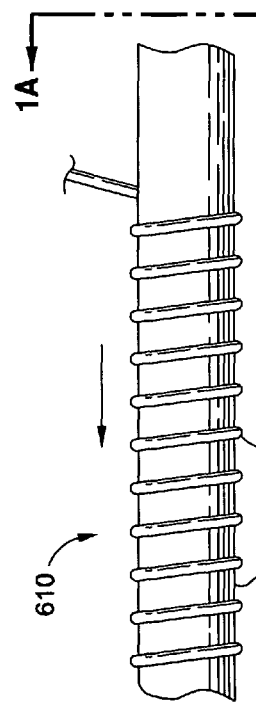
FIG. 1A is a fragmentary transverse cross sectional view of the tubing seen in FIG. 1, and is seen during a step of the manufacturing process.
Figure 3:
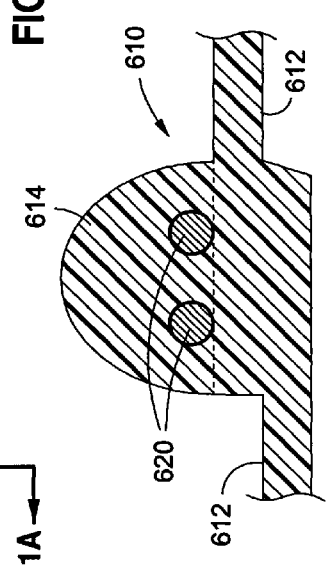
Figure 2:
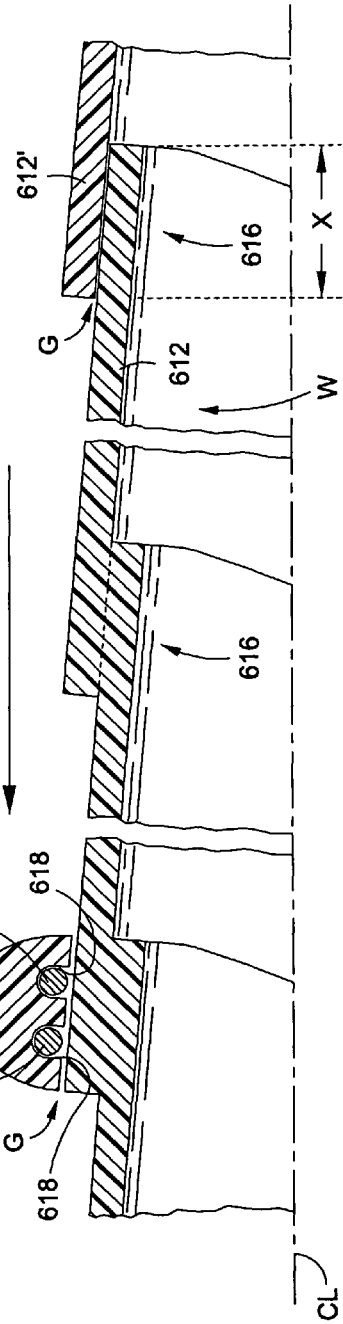
FIG. 2 is a fragmentary elongate cross sectional view taken along the centerline of the tubing seen in FIG. 1, and is also seen during the manufacturing process.
Figure 4:
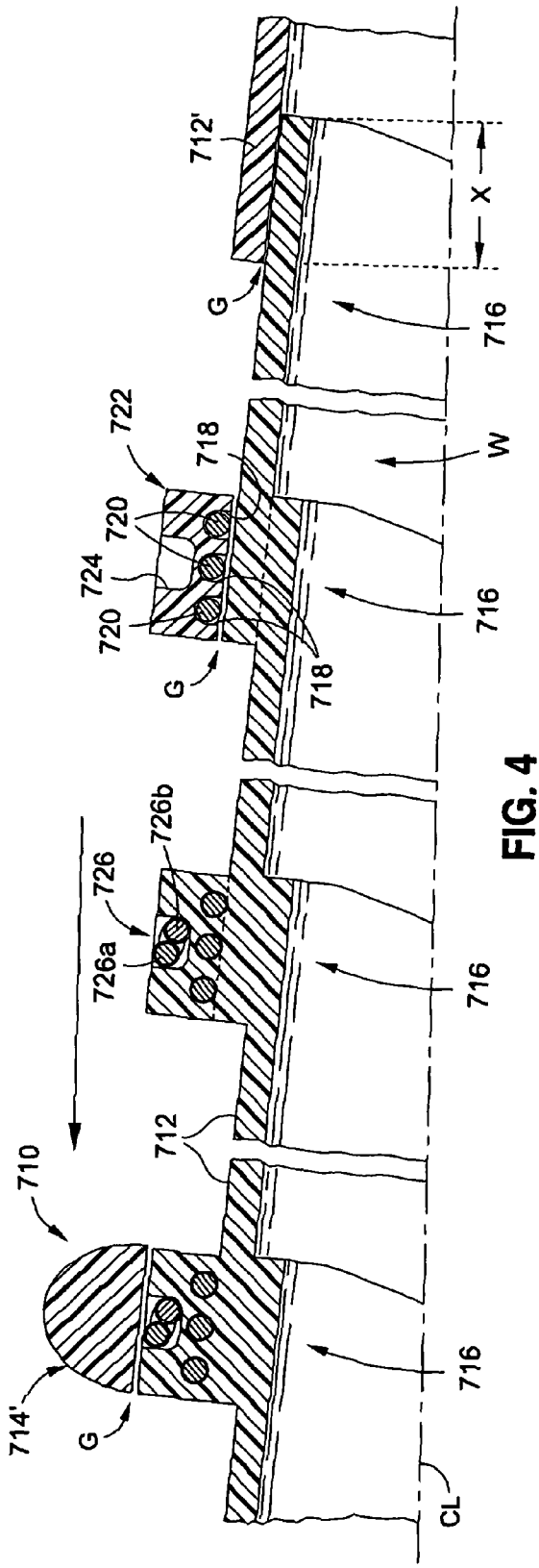
Figure 5:
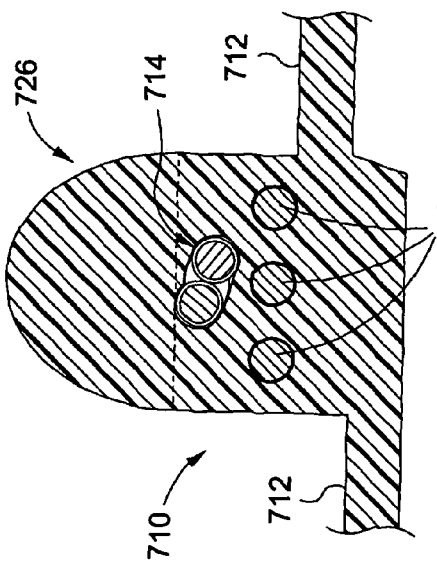
Figure 6:
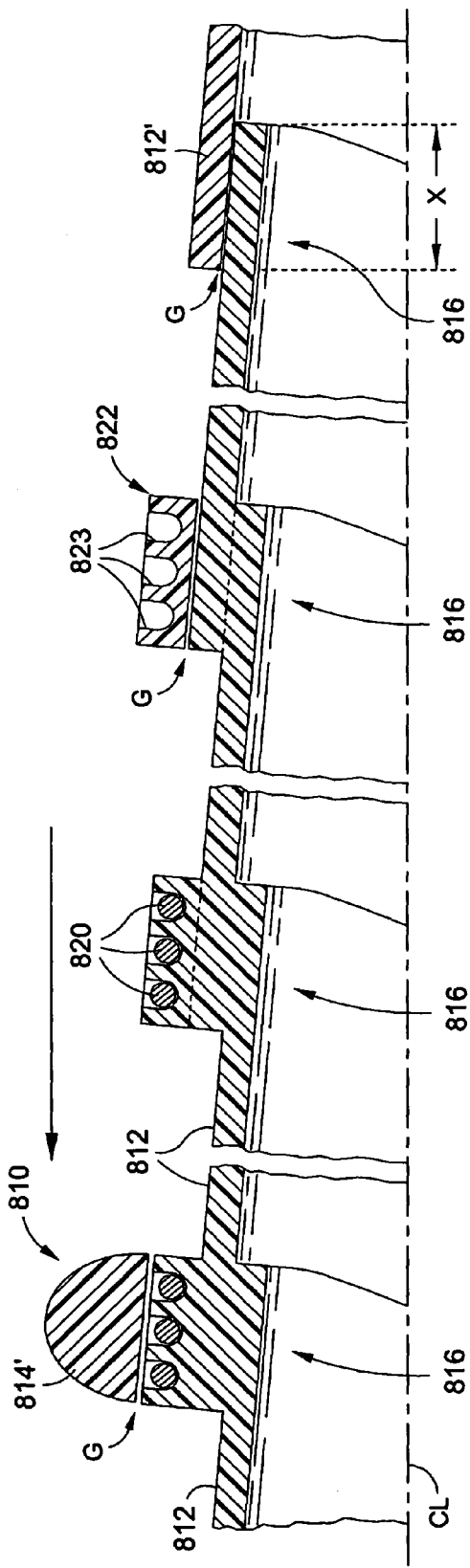
Figure 7:
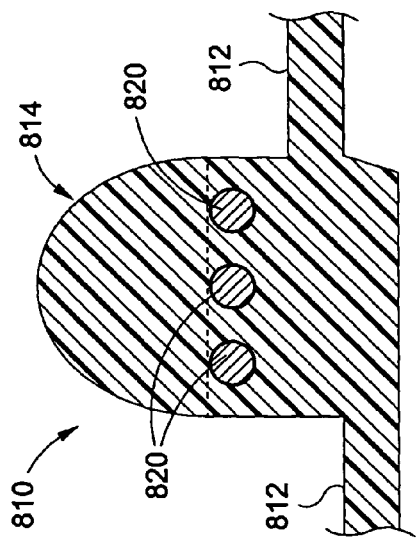

FIG. 3 provides a fragmentary cross sectional view of an elongate section of the wall of the tubing seen in FIGS. 1 and 2 during manufacture with manufacturing being substantially complete;

FIGS. 4 and 5 provide fragmentary cross sectional views of an elongate section of an alternative embodiment of tubing, and are similar to that of FIGS. 2 and 3, respectively; and FIGS. 6 and 7 provide a fragmentary cross sectional views of an elongate section of another alternative embodiment of tubing, and are also similar to that of FIGS. 2 and 3, respectively.

DETAILED DESCRIPTION OF EXEMPLARY PREFERRED EMBODIMENTS OF THE INVENTION

Figure 1A:
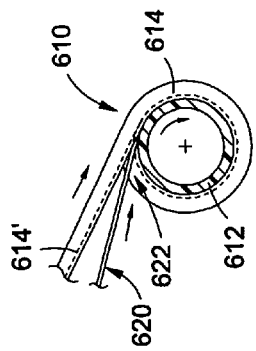

Considering now FIGS. 1, 1a, 2, and 3 in conjunction with one another, and viewing first FIGS. 1 and 1a, it is seen that the tubing 610 according to this invention has an exterior appearance essentially the same as conventional tubing of this type. That is, the tubing has a comparatively thin and flexible wall 612, and a helical bead 614 protruding somewhat above this wall and extending helically about and along the length of the tubing. As will be seen, the tubing 610 also includes embedded conductors (not seen in FIG. 1) extending helically about and along the tubing 610 at the bead 614. That is, the conductors extend about and along the length of tubing 610 from end to end. Advantageously, particular embodiments of the present tubing include an arrangement of conductors which well preserves the quality of instrumentation signals conveyed along the length of the tubing. Other embodiments of the present tubing include conductors which are especially disposed within the tubing so as to have an advantageous thermal conductivity to fluid flow in the tubing, and to be well insulated from ambient.

Viewing now FIGS. 1A and 2, which together illustrate both structures as well as steps in the process of making the present inventive tubing, it is seen that the wall 612 is formed by successive helical wraps of an elongate thin thermoplastic ribbon 612'. This thermoplastic ribbon 612' is initially in molten condition, having just been discharged from the die of a plastic extrusion machine (not seen in the drawing Figures). At the right-hand side of FIG. 2, the most recently extruded portion of ribbon 612' is about to touch down (note the slight gap "G") on a previously extruded portion of ribbon 612' which is wrapped about spinning winding rolls (also not seen in the drawing Figures). Thus, the tubing structure forming in FIG. 2 is spinning about its centerline, indicated at "CL."

Again, as is seen best at the right hand end of FIG. 2, just before the moment a successive wrap of the ribbon 612' touches a preceding wrap (again, note the slight gap "G"), the wraps of ribbon 612' are distinct from one another in axial cross section (but are integral with one another helically along the length of the ribbon 612'—that is, helically about the winding rolls), and the successive wraps of ribbon 612' as they touch and interbond form a wrap or overlap joint, indicated with arrow 616 (note the overlap dimension "X" indicated in FIG. 2).

In other words, as the wraps of ribbon 612' touch they bond together, and as is seen at the next lap joint 616 to the left in FIG. 2, the successive wraps of ribbon 612' have touched at joint 616 and heat bonded to one another (i.e., the ribbon is molten thermoplastic at this time), and the wraps of ribbon 612' are now integral with one another both helically and axially along the length of the tubing 610. It is for this reason that the cross hatching of FIG. 2 shows the tubing structure 610 becoming an integral whole. The joint lines at what were once individual parts may be indicated in the various drawing Figures with dashed lines as on FIG. 2, but the structure of the plastic tubing 610 is a unity. Again, it will be recalled that the tubing 610 during manufacture is both spinning about its axis (i.e., about centerline "CL"), and as it is formed is moving leftwardly relative to the viewer of FIG. 2, as is indicated by the left-facing arrows on FIGS. 1 and 2. Also, the inner surface of the wraps of ribbon 612' (i.e., disposed toward the centerline indicated on FIG. 2) is being actively cooled by a water spray, indicated on FIG. 2 by the arrow "W". Moreover, it is to be noted again that the change in status of the successive wraps of ribbon 612' denoting the formation of a integral tubular body is indicated on FIG. 2 by the successive changes from distinct cross hatches, to an integral or uniform cross hatch both for the successive wraps of ribbon 612' as well as for other parts of the tubing 610, as will be seen.

At the next successive lap joint 616 to the left in FIG. 2 it is seen that a combination structure of a molten extruded bead portion 614' and a pair of conductors 620 is about to be applied substantially simultaneously to the tubular body formed by interbonded wraps of ribbon 612' (note the slight gap "G" seen in FIG. 2). On its lower or radially inwardly disposed face, the bead portion 614' defines a pair of elongate and parallel grooves 618, which are sized to receive the conductors 620. Moreover, viewing FIG. 1A, it is seen that the conductors 620 and bead portion 614' converge toward a common point or destination (indicated on FIG. 1A with arrowed numeral 622) of touch down on the spinning tubular wall of tubing 610 formed by the interbonded wraps of ribbon 612'. Because of this convergence of the bead portion 614' and conductors 620, the grooves 618 are effective to guide the conductors 620 with a high degree of precision to their desired locations beneath and within the bead 614 of the tubing 610. While FIG. 2 depicts the combination structure of bead portion 614' and conductors 620 just before touching down on the wall of the tubular body formed of wrapped and interbonded ribbon 612', FIG. 3 shows this structure after the interbonding has been effected during making of the tubing 610. That is, FIG. 3 shows that the tubing 610 is an integral structure including tubing walls 612, bead 614, and conductors 620.

Considering now FIGS. 4 and 5 in conjunction with one another, and viewing first FIG. 4, it is seen that the making of an alternative embodiment of tubing 710 is depicted. Because this alternative embodiment of tubing 710 includes many features that are the same as, or which are analogous in structure or function to, those of the first embodiment of FIGS. 1-3, these features are referenced by the same numeral used above, and increased by one-hundred (100). The tubing 710 has an exterior appearance essentially the same as conventional tubing of this type, and the same as the tubing 610 of FIGS. 1-3. That is, the tubing 710 has a comparatively thin and flexible wall 712, and a helical bead 714 protruding somewhat above this wall and extending helically about and along the length of the tubing. The tubing 710 also includes embedded conductors extending helically at the bead 714 and along the length of tubing 710 from end to end as is further explained below.

Viewing now FIG. 4 in greater detail, (which is much like FIG. 2 in schematic illustration of the manufacture of tubing 710) both structures as well as steps in the process of making an inventive tubing 710 are seen. That is, it is seen that the wall 712 is formed by successive helical wraps of an elongate thin thermoplastic ribbon 712'. This thermoplastic ribbon 712' is initially in molten condition, having just been discharged from the die of a plastic extrusion machine (not seen in the drawing Figures). At the right-hand side of FIG. 4, the most recently extruded portion of ribbon 712' is about to touch down (note the slight gap "G") on a previously extruded portion of ribbon 712' which is wrapped about spinning winding rolls (also not seen in the drawing Figures). The reader will note that up to this time in the manufacture of the tubing 710 the embodiment of FIGS. 4 and 5 is the same as the embodiment of FIGS. 1-3. And again, it is to be recalled that the tubing structure forming in FIG. 4 is spinning about its centerline, indicated at "CL."

Again, before ribbon 712' touches a preceding wrap (again, note the slight gap "G"), the wraps of ribbon 712' are distinct from one another in axial cross section (but are integral with one another helically along the length of the ribbon 712', and the successive wraps of ribbon 712' as they touch and interbond form a wrap or overlap joint, indicated with arrow 716. The reader will recall that as the molten wraps of ribbon 712' touch they bond together, and as is seen at the next lap joint 716 to the left in FIG. 4, the successive wraps of ribbon 712' have touched at joint 716 and heat bonded to one another so that the wraps of ribbon 712' are now integral with one another both helically and axially along the length of the tubing 719. Axial movement of the forming tubing 710 is indicated by the left-facing arrow on FIG. 4. Also, as before, the inner surface of the wraps of ribbon 712' (i.e., disposed toward the centerline indicated on FIG. 4) is being actively cooled by a water spray, indicated on FIG. 4 by the arrow "W".

At the next successive lap joint 716 to the left in FIG. 4 it is seen that a combination structure of a molten extruded plateau portion 722 and three conductors 720 is about to be applied substantially simultaneously to the tubular body formed by interbonded wraps of ribbon 712' (note the slight gap "G"— and recall the illustration of FIG. 1A). On its lower or radially inwardly disposed face, the plateau portion 722 defines three elongate and parallel grooves 718, which are sized to receive the conductors 720. In other words, the conductors 720 and plateau portion 722 converge toward a common point or destination of touch down on the spinning tubular wall of tubing 710 formed by the interbonded wraps of ribbon 712' much as was depicted and described by reference to FIG. 1A and the first embodiment of FIGS. 1-3. The grooves 718 are effective to guide the conductors 720 with a high degree of precision to their desired locations beneath the plateau portion 722 of the tubing 710. At the next lap joint 716 to the left on FIG. 4, the fact of interbonding of the plateau portion with the tubular body of the tubing 710 is depicted. So it is to be understood that the tubing 710 forming to this point in time is an integral structure including tubing walls 712, plateau 722, and conductors 720. It is to be noted that plateau portion 722 is essentially another ribbon, like ribbon 712', but smaller and differing in details of structure.

It is also to be noted that the plateau portion 722 defines a radially outwardly opening elongate groove 724. As is illustrated at the next lap joint 716 to the left in FIG. 4, this groove 724 next receives a conductor pair, indicated with arrowed numeral 726. This conductor pair 726 is comprised of a twisted pair of conductors 726a and 726b. Each of the conductors preferably carries a coating of insulation (too thin to be illustrated in the drawing Figures) so that the conductors 726a and 726b are insulated from one another.

FIGS. 4 and 5 also show that very shortly after the placement of the conductor pair 726 within the groove 724 a bead portion 714' is extruded (i.e., molten plastic) and is disposed on top of the plateau 722 and conductor pair 726 (note the slight gap "G" in FIG. 4). So the plateau portion 722 forms a base or foundation upon which the bead portion 714' secures. Together, the plateau portion 722 and bead portion 714' form the bead 714 seen on the outside of tubing 710 (which outwardly appears just like the tubing 610 seen in FIG. 1). The moment after touch down of the bead portion 714' atop of the plateau portion 722 is depicted in FIG. 5, illustrating that the plastic components of the tubing 710 heat bond with one another into a unitary whole, carrying the conductors 720 and conductor pair 726.

Considering now FIGS. 6 and 7 in conjunction with one another, and viewing first FIG. 6, it is seen that the making of yet another alternative embodiment of tubing 810 is depicted. Because this alternative embodiment of tubing 810 includes many features that are the same as, or which are analogous in structure or function to, those of the first embodiment of FIGS. 1-3, these features are referenced by the same numeral used above, and increased by two-hundred (200). The tubing 810 has an exterior appearance essentially the same as conventional tubing of this type, and the same as the tubing 610 of FIGS. 1-3, and the tubing 710 of FIGS. 4 and 5. That is, the tubing 810 has a comparatively thin and flexible wall 812, and a helical bead 814 protruding somewhat above this wall and extending helically about and along the length of the tubing. The tubing 810 also includes embedded conductors extending helically at the bead 814 and along the length of tubing 810 from end to end as is further explained below.

Viewing now FIG. 6, (which is much like FIGS. 2 and 4) both structures as well as steps in the process of making an inventive tubing 810 are illustrated. It is seen in FIG. 6 that the wall 812 is formed by successive helical wraps of an elongate thin thermoplastic ribbon 812'. The first step of formation of the tubing wall is as was explained above for the first two embodiments. A lap joint 816 is formed by the overlapped and interbonded wraps of ribbon 812'.

At the next successive lap joint 816 to the left in FIG. 6 it is seen that a molten extruded plateau portion 822 is about to be applied to the tubular body formed by interbonded wraps of ribbon 812' (note the slight gap "G"). Again, the plateau portion 822 is another ribbon, like ribbon 812' but smaller and differing in details of structure. On its upper or radially outwardly disposed face, the plateau portion 822 defines three elongate and parallel grooves 824, which are sized to receive conductors 820. The conductors 820 are placed into the grooves 824 at the next successive lap joint 816 to the left, as illustrated in FIG. 6. The grooves 824 are effective to guide the conductors 820 with a high degree of precision to their desired locations on the plateau portion 822 of the tubing 810.

At the next lap joint 816 to the left on FIG. 6 (i.e., where placement of conductors 820 is indicated), the fact of interbonding of the plateau portion 822 with the tubular body of the tubing 810 is depicted. It is also to be noted that the plateau portion 822 will provide a base or foundation upon which the bead 814 of the tubing 810 will be received. That is, as is illustrated at the next lap joint 816 to the left in FIG. 6, very shortly after the placement of the conductors 820 within the grooves 824 a bead portion 814' is extruded (i.e., molten plastic) and is disposed on top of the plateau 822 and conductors 820 (note the slight gap "G" in FIG. 6). So the plateau portion 822 forms a base or foundation upon which the bead portion 814' secures. Together, the plateau portion 822 and bead portion 814' form the bead 814 seen on the outside of tubing 810 (which outwardly appears just like the tubing 610 seen in FIG. 1). The moment after touch down of the bead portion 814' atop of the plateau portion 822 is depicted in FIG. 7, illustrating that the plastic components of the tubing 810 heat bond with one another into a unitary whole, carrying the conductors 820.

It will be understood that during and after formation of the tubing constructions 610, 710, and 810 as described above, the tubing is subjected to cooling, which may include a conduit disposed within the winding head and which sprays water directed radially outwardly against the inner surface of the tubing as it forms (i.e., water spray "W" described by reference to FIG. 2 in particular). Also, to the left (i.e., in the direction of axial movement of the forming tubing) of the manufacturing steps indicated in FIGS. 2, 4, and 6 (i.e., outside of the view of these Figures) is conventionally disposed a cooling trough containing water into which the tubing enters as it proceeds leftwardly (recalling the motion arrow on FIG. 2). The cooling water in this trough finishes cooling of the tubing product from its molten condition to a finished flexible plastic integral tubular product. Conventionally, the tubing is then cut into pre-selected lengths for storage or shipment in a box.

The resulting tubing 610 (and 710 and 810 as well) includes a thin flexible wall (i.e., wall 612) section extending between adjacent wraps of the bead 614, as is seen best in FIG. 1. This thin flexible wall portion provides for exceptional flexibility for the tubing, while the bead 614 provides support for the wall so that the tubing is kink and collapse-resistant. Also, the conductors disposed at the bead have desirable electrical properties when used to convey electrical signals. And may be used to provide resistance heating to the tubing as well. On the other hand, telemetry or instrumentation signals (i.e., light, fiber optic, or electrical signals) may be conducted along the conductors.

While exemplary forms or embodiments of the invention has been shown in the drawings and described herein, variations from these exemplary forms will be apparent to those skilled in the art. For example, a tubing providing a duality or plural twisted pair conductor sets disposed within a bead of the tubing is clearly within the ambit of this invention. Similarly, a tubing having conductors disposed within a bead structure of the tubing and at differing radial levels (i.e., radially spaced) relative to the center of the tubing and relative to one another is also part of this invention. The invention therefore should not be construed as limited to the specific forms shown and described, but instead as is set forth in the following claims, which provide a definition of the invention.

What is claimed is:

1. A thin-walled, flexible and collapse-resistant thermoplastic tubing having a substantially smooth bore and a helical outer support bead structure, the tubing including at least one conductor helically disposed within said support bead structure, said tubing comprising:

a flexible tubing wall formed of an elongate thermoplastic ribbon while molten being helically wrapped repeatedly on itself to partially overlap successive wraps of said ribbon a certain amount forming a helical lap joint where successive wraps of said ribbon heat-bond integrally to one another so that an elongate tubular body is formed;

a second elongate thermoplastic portion while molten being helically wrapped about said tubular body at said lap joint and heat-bonding integrally thereto, said second elongate thermoplastic portion defining at least one elongate fine-dimension groove;

at least one elongate conductor disposed in said elongate fine-dimension groove of said second elongate thermoplastic portion to extend helically around and along said elongate tubular body;

said tubing further including an outwardly disposed elongate thermoplastic support bead extending helically around and along said elongate tubular body, whereby said tubular body, said elongate second thermoplastic portion and said support bead integrally heat bonding together to form a unitary structure.

2. The tubing of claim 1 wherein said second elongate thermoplastic portion defines said at least one fine-dimension groove on a radially inner surface thereof, and said at least one elongate conductor is disposed radially substantially between said tubing wall and said second elongate thermoplastic portion.

3. The tubing of claim 2 wherein said second elongate thermoplastic portion outwardly defines said bead.

4. The tubing of claim 3 wherein said second elongate thermoplastic portion on a radially inner surface defines a pair of grooves, and said pair of grooves each individually receiving one of a pair of conductors extending in parallel about and along said tubing, whereby said bead formed by said second elongate thermoplastic portion captures said pair of conductors therein.

5. The tubing of claim 1 wherein said second elongate thermoplastic portion includes an elongate fine-dimension ribbon which is substantially flat and defines at least one radially outwardly disposed groove extending there along to extend helically about and along said tubing forming a radially outwardly extending plateau thereon, at least one conductor disposed in said at least one radially outwardly disposed groove of said fine-dimension ribbon, and a third fine-dimension portion extending helically about and along said tubing atop of said fine-dimension ribbon to define said bead.

6. The tubing of claim 5 wherein a pair of conductors twisted about one another to form a twisted pair conductor set are disposed within said at least one radially outwardly disposed groove of said fine-dimension ribbon.

7. A thin-walled, flexible and collapse-resistant thermoplastic tubing having a substantially smooth bore and a helical outer support bead structure, the tubing including plural conductors helically disposed within said support bead structure, said tubing comprising:
    a flexible tubing wall formed of an elongate thermoplastic ribbon while molten being helically wrapped repeatedly on itself to partially overlap successive wraps of said ribbon a certain amount forming a helical lap joint where successive wraps of said ribbon heat-bond integrally to one another so that an elongate tubular body is formed;
    a second elongate thermoplastic portion while molten being helically wrapped about said tubular body at said lap joint and heat-bonding integrally thereto to form a plateau, said second elongate thermoplastic portion outwardly defining plural elongate fine-dimension grooves;
    plural elongate conductors disposed one in each of said plural fine-dimension grooves to extend helically around and along said elongate tubular body;
    said tubing further including an outwardly disposed elongate thermoplastic support bead extending helically around and along said elongate tubular body, said support bead being disposed atop of said plateau and said conductors, whereby said tubular body, said plateau and said support bead are integrally heat bonded together to form a unitary structure.

8. A thin-walled, flexible and collapse-resistant thermoplastic tubing having a substantially smooth bore and a helical outer support bead structure, the tubing including plural conductors helically disposed within said support bead structure, said tubing comprising:
    a flexible tubing wall formed of an elongate thermoplastic ribbon while molten being helically wrapped repeatedly on itself to partially overlap successive wraps of said ribbon a certain amount forming a helical lap joint where successive wraps of said ribbon heat-bond integrally to one another so that an elongate tubular body is formed;
    a second elongate thermoplastic portion while molten being helically wrapped about said tubular body at said lap joint and heat-bonding integrally thereto to form a plateau, said second elongate thermoplastic portion defining plural elongate fine-dimension grooves;
    elongate conductors disposed in said plural fine-dimension grooves to extend helically around and along said elongate tubular body;
    said tubing further including an outwardly disposed elongate thermoplastic support bead extending helically around and along said elongate tubular body, said support bead being disposed atop of said plateau and said conductors, whereby said tubular body, said plateau and said support bead are integrally heat bonded together to form a unitary structure.

9. The tubing of claim 8 wherein said second elongate thermoplastic portion defines said at least one fine-dimension groove on a radially inner surface thereof, and at least one elongate conductor is disposed radially substantially between said tubing wall and said second elongate thermoplastic portion.

10. The tubing of claim 9 wherein said second elongate thermoplastic portion outwardly defines said support bead.

11. The tubing of claim 8 wherein said second elongate thermoplastic portion on a radially inner surface defines plural grooves, and said plural grooves each individually receiving one of said conductors extending in parallel about and along said tubing.

12. The tubing of claim 8 wherein said second elongate thermoplastic portion includes an elongate fine-dimension ribbon which is substantially flat and defines at least one radially outwardly disposed groove extending helically about and along said tubing, and at least one conductor disposed in said at least one radially outwardly disposed groove of said fine-dimension ribbon.

13. A method for making a helically wound, seamless plastic tubing comprising the steps of:
    forming an elongate ribbon of molten thermoplastic, helically wrapping said elongate ribbon so that it partially overlaps itself to form a helical lap joint and simultaneously heat-bonds to itself to form an elongate tubular body;
    forming a second elongate thermoplastic portion defining an elongate groove;
    integrally heat bonding said second elongate thermoplastic portion to said tubular body; and
    laying an elongate conductor helically around and along said tubular body within said at least one elongate groove of said second elongate portion.

14. The method of claim 13 wherein the steps of laying said conductor in said at least one elongate groove and of integrally heat bonding said second elongate thermoplastic portion to said tubular body are performed substantially simultaneously.

15. The method of claim 14 further including the step of utilizing said second elongate thermoplastic portion to define a support bead extending radially outwardly on said tubular body.

16. The method of claim 13 further including the steps of configuring said second elongate thermoplastic portion to radially outwardly define at least one elongate groove opening radially outwardly thereon, and laying at least one conductor in said at least one elongate radially outwardly opening groove to extend helically about and along said tubular body.

17. The method of claim 16 wherein said step of laying at least one conductor in said radially outwardly opening groove includes the step of including said at least one conductor in a twisted pair conductor set.

* * * * *